(12) United States Patent
Hierholzer et al.

(10) Patent No.: US 7,542,424 B2
(45) Date of Patent: Jun. 2, 2009

(54) METHOD FOR SETTING UP CONNECTIONS WITH GUARANTEED QUALITY OF SERVICE FOR A COMMUNICATIONS NETWORK HAVING A RESOURCE MANAGER

(75) Inventors: Peter Hierholzer, Wielenbach (DE); Karl Klaghofer, München (DE); Harald Müller, Gilching (DE); Christian Prehofer, München (DE)

(73) Assignee: Siemens Aktiengesellschaft, Munich (DE)

( * ) Notice: Subject to any disclaimer, the term of this patent is extended or adjusted under 35 U.S.C. 154(b) by 735 days.

(21) Appl. No.: 10/380,951

(22) PCT Filed: Sep. 7, 2001

(86) PCT No.: PCT/DE01/03463

§ 371 (c)(1), (2), (4) Date: Jun. 1, 2003

(87) PCT Pub. No.: WO02/25876

PCT Pub. Date: Mar. 28, 2002

(65) Prior Publication Data

US 2004/0037293 A1    Feb. 26, 2004

(30) Foreign Application Priority Data

Sep. 20, 2000   (DE) ................... 100 46 583

(51) Int. Cl.
*H04L 12/26* (2006.01)
(52) U.S. Cl. .................... 370/236; 370/468

(58) Field of Classification Search ............ 370/395.21, 370/395.2, 230, 235, 236, 395.1, 468
See application file for complete search history.

(56) References Cited

U.S. PATENT DOCUMENTS

| 6,078,582 | A | 6/2000 | Curry et al. |
| 6,081,513 | A | 6/2000 | Roy |
| 6,529,499 | B1 * | 3/2003 | Doshi et al. ............ 370/352 |
| 6,633,539 | B1 * | 10/2003 | Basso et al. ............ 370/229 |
| 6,647,265 | B1 * | 11/2003 | Olofsson et al. ........ 455/445 |
| 2005/0047337 | A1 * | 3/2005 | Virtanen ............... 370/229 |

FOREIGN PATENT DOCUMENTS

| EP | 1 011 230 A2 | 6/2000 |
| EP | 1 018 822 A2 | 7/2000 |
| WO | WO 00/08812 | 2/2000 |

* cited by examiner

*Primary Examiner*—Ricky Ngo
*Assistant Examiner*—Gary Mui
(74) *Attorney, Agent, or Firm*—Staas & Halsey LLP

(57) ABSTRACT

Transmission resources of one or more individual transmission links, especially of individual transmission bottlenecks, are managed by a resource manager. In the course of a setting up of a connection, the resource manager determines, by using an item of connection information, the origin and destination of the connection to be set up, and identifies whether this connection is routed over a particular transmission link. Based on the result of the determination, a message is subsequently generated and transmitted to the origin of the connection. A selection of transmission resources to be used for the connection is then carried out based on the transmitted message.

19 Claims, 1 Drawing Sheet

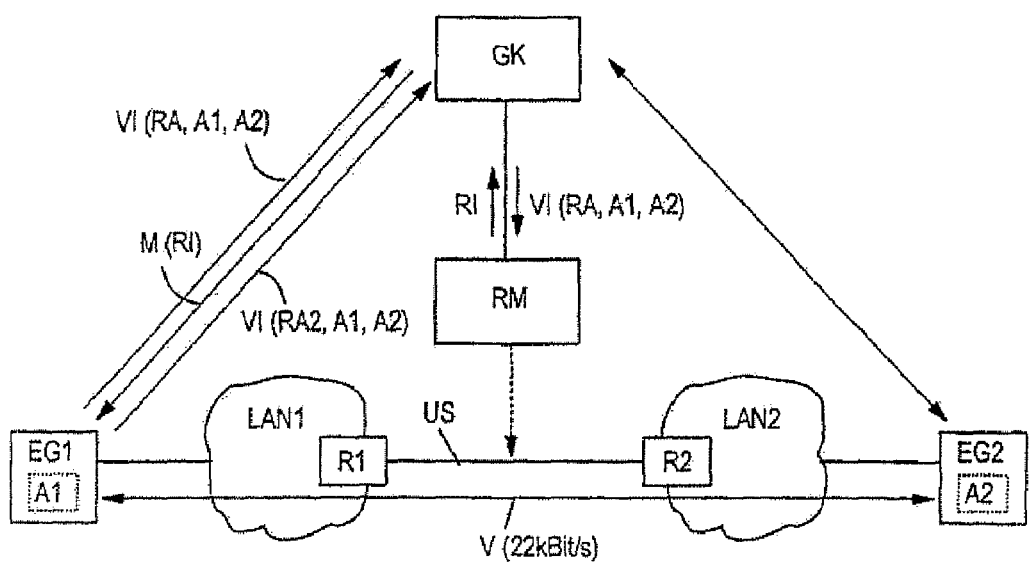

METHOD FOR SETTING UP CONNECTIONS WITH GUARANTEED QUALITY OF SERVICE FOR A COMMUNICATIONS NETWORK HAVING A RESOURCE MANAGER

CROSS REFERENCE TO RELATED APPLICATIONS

This application is based on and hereby claims priority to PCT Application No. PCT/DE01/03463 filed on 7 Sep. 2001 and German Application No. 100 46 583.8 filed on 20 Sep. 2000, the contents of which are hereby incorporated by reference.

BACKGROUND OF THE INVENTION

In many packet-oriented communications networks, such as the Internet, no Quality of Service is guaranteed for connections between terminals in these communications networks unless additional arrangements are made. The Quality of Service (QoS) of a connection may include different transmission and connection resources, such as the transmission bandwidth, transmission rate, permissible error rate and/or transmission duration.

In modern communication systems, which are frequently based on packet-oriented communications networks of this kind, so-called resource managers are provided to ensure a specified Quality of Service. These are in each case assigned to a communications network or subnetwork and administer its relevant transmission resources. With a resource manager, pre-definable transmission resources can be reserved for each specific connection to be set up. When transmission resources have been successfully reserved, the resource manager monitors the continuous availability of the reserved transmission resources for the relevant connection.

In many cases, connections must be established between different subnetworks of a communication system, the subnetworks themselves having a very high transmission bandwidth, but being interconnected by one or more individual transmission links with relatively low transmission bandwidth. A typical example of this is Local Area Networks (LANs) which are interconnected via a public telephone network. The telephone network with its relatively low transmission bandwidth in this case constitutes a bottleneck for data interchange between the LANs.

The problem often arises that the transmission resources of such a bottleneck are usually exhausted by even a relatively small number of connections having a resource requirement that is typical of a subnetwork with high transmission bandwidth. This generally results in a relatively high rejection rate for connections to be routed via the bottleneck.

SUMMARY OF THE INVENTION

A potential object of the present invention is to specify a method of setting up connections with guaranteed Quality of Service for a packet-oriented communications network, permitting efficient monitoring of transmission resources of individual transmission links, specifically of individual transmission bottlenecks, and allowing the rejection rate of connections to be routed via such transmission links to be reduced.

With the method according to one aspect of the invention, transmission resources of a transmission link are administered by a resource manager. As part of connection setup, the resource manager determines, on the basis of connection information identifying the origin and destination of the connection to be set up, whether the connection is routed via the transmission link. Depending on the result of this determination, a message is then generated and transmitted to the origin of the connection. The result of the determination can be reflected both in the content of the message and in the message being generated at all. At the origin of the connection, information is therefore available which is dependent on whether the connection to be set up is routed via the transmission link in question. Depending on the message transmitted, a selection of transmission resources required for the connection is then initiated at the origin of the connection.

In this way, the resource requirement of a connection to be set up can be matched to the transmission conditions of the transmission link depending on whether that connection is routed via the transmission link. This means that the rejection rate of connections to be routed via the transmission link can be considerably reduced by, for example, first attempting to reduce the resource requirement of the connection to a permissible level instead of immediately rejecting a connection whose original resource requirement is not available. In this case, definitive rejection of the connection only takes place if no such reduction is possible. This enables the transmission resources of the transmission link to be much better utilized.

In the context of the method, the term "connection" may also be taken to mean so-called virtual connections, trunk groups, connection paths or data streams generally, with defined origin and destination in each case. Origin and destination refer here, for example, to terminals, network nodes, switching equipment, communications networks, subnets and subnetworks.

The connection Quality of Service administered by the resource manager can relate to quite different transmission resources, such as transmission bandwidth, transmission rate, permissible error rate, transmission delay and/or any other so-called QoS parameters, possibly service- and/or priority-class-specific.

According to an advantageous embodiment, the message can be generated as a function of the level of transmission resources of the transmission link, both the message content and transmission of the message depending on the level of the resources.

According to an initial variant of the method, the message can be generated as a function of the currently available level of resources of the transmission link, i.e. depending on its current load situation. This variant is particularly advantageous for transmission links utilized by only a small number of users and having a variable bandwidth.

According to a second variant of the method, only the total available level of resources of the transmission link is taken into account when generating the message. In this variant, the message can be used e.g. to reduce the transmission resources to be utilized for all the connections to be routed via the transmission link, irrespective of temporary load fluctuations on the transmission link. In this way the number of connections to be set up simultaneously over the transmission link can be increased.

According to an advantageous development, one or more existing connections routed via the transmission link can be assigned modified transmission resources depending on whether a new connection to be set up is routed via the transmission link. Transmission resources of an existing connection can thus be reduced so that a new connection to be set up, which would otherwise be rejected, can be permitted.

In addition, using the connection information, a resource request for the connection to be set up can be communicated to the resource manager and taken into account when generating the message. Preferably the resource request can be compared with the available level of resources of the transmission link by the resource manager and the message can be generated depending on the result of the comparison. For example, the transmission resources of the connection to be set up and/or of an existing connection can be reduced by a corresponding message if the resource requirement exceeds the available level of resources of the transmission link. In addition, the transmission resources of the connection to be set up and/or of an already existing connection can also be reduced when, after the connection has been set up in accordance with the resource request, this leaves the transmission link with insufficient residual transmission resources. In general, modification of the transmission resources of the connection to be set up and/or of an already existing connection can take place depending on the residual transmission resources remaining for the transmission link.

According to another advantageous development, the message can include resource information dependent on the available level of resources of the transmission link which is taken into account for selecting the transmission resources to be taken up by the connection. The resource information can specify, for example, the currently available level of resources of the transmission link, a specification or allocation of transmission resources to be taken up by the connection and/or the maximum available transmission resources available for the connection to be set up.

The message can additionally include method information concerning the transmission method to be used for the connection. Method information of this kind can be, for example, a data compression method, encoding method and/or a data compression stage.

According to an advantageous development, it is possible to ascertain, e.g. by the resource manager or a so-called gatekeeper, whether and/or to what extent selection of transmission resources required by the connection is supported at the origin of the connection. The subsequent connection setup and/or generation of the message can then take place accordingly.

In addition, link information can be transmitted to the resource manager allowing it to identify the transmission link. This communication of link information also enables the resource manager to separately administer a plurality of transmission links identifiable in each case on the basis of the link information using the method.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The FIGURE shows a schematic view of a communication system having two subnetworks connected via a transmission link.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The FIGURE schematically illustrates a communication system having two packet-oriented, preferably Internet-protocol-based communication subnetworks LAN1 and LAN2 implemented in this embodiment as Local Area Networks (LANs). The Local Area Network LAN1 has a router R1 which is connected via a transmission link US to a router R2 of the Local Area Network LAN2. In the embodiment it will be assumed that the transmission link US has much fewer transmission resources than the Local Area Networks LAN1 and LAN2 and therefore constitutes a bottleneck for data interchange between the Local Area Networks LAN1 and LAN2. A situation of this kind frequently arises in practice when, for example, several corporate Local Area Networks situated at different locations are interconnected as transmission links via a public communications network or the Internet. Local Area Networks interconnected in this way are often also known as "Virtual Private Networks" (VPNs).

To administer transmission resources of the Local Area Networks LAN1 and LAN2 and in particular of the transmission link US, a central resource manager RM is disposed in the communication system. The resource manager RM has responsibility in the communication system for reserving transmission resources for connections to be set up and for ensuring the Quality of Service of established connections. The transmission resources or Quality of Service may relate to quite different transmission parameters, such as maximum or average transmission bandwidth, transmission delay and/or transmission error rate. For all connections requiring a Quality of Service guarantee in the communication system, the corresponding transmission resources must be requested from the resource manager RM and released again by the resource manager RM when the connection has been cleared down. As already mentioned above, the available transmission resources of the transmission link US are much fewer than the transmission resources of the Local Area Networks LAN1 and LAN2. For this reason, it is the available level of resources of the transmission link US that is the critical factor for monitoring the transmission resources for connections routed via the transmission link US. Specific monitoring of the transmission resources of the transmission link US by the resource manager RM is indicated by the dashed arrow in the FIGURE.

In addition, a terminal EG1 is connected to the Local Area Network LAN1 and a terminal EG2 is connected to the Local Area Network LAN2. The terminals EG1 and EG2 can be implemented as any communication terminals, e.g. for voice, video and/or data communication, or as a personal computer. Address information A1 is assigned to the terminal EG1 and address information A2 is assigned to the terminal EG2. The terminals EG1 and EG2 can be unambiguously addressed and identified in the communication system via address information A1 and A2 respectively. In an alternative embodiment, another router, switch or another network node of the communication system can be provided instead of at least one of the terminals EG1 and EG2, for example.

The communication system additionally has a central so-called gatekeeper GK which is linked to the resource manager RM. The gatekeeper GK is responsible for logic control, i.e. for setting up and clearing down as well as monitoring connections in the communication system. To set up a connection with guaranteed Quality of Service, the origin and destination of the connection to be set up must be communicated to the gatekeeper GK. In this embodiment, the gatekeeper GK satisfies ITU-T Recommendation H.323.

According to a further embodiment, a SIP server supporting a so-called Session Initiation Protocol (SIP) compliant with the IETF Standard can be used instead of the gatekeeper GK.

In the present embodiment, the setting-up of a connection V, e.g. for voice transmission (VoIP: Voice over Internet Protocol), with guaranteed Quality of Service from the terminal EG1 to the terminal EG2 will be considered. As part of connection setup, connection setup signaling is performed between the terminal EG1 and the gatekeeper GK and between the gatekeeper GK and the terminal EG2. For this purpose logical signaling channels are set up between the terminal EG1 and the gatekeeper GK and between the gatekeeper GK and the terminal EG2 which are illustrated by solid arrows in the FIGURE. Connection setup signaling is preferably in accordance with ITU-T Recommendation H.323 v2. This type of connection setup signaling is also commonly known as "fast connect".

As part of initiating connection setup, connection setup information VI is communicated to the gatekeeper GK by the terminal EG1. The connection setup information VI contains the address information A1 identifying the originating endpoint EG1, the address information A2 identifying the destination endpoint EG2 as well as a resource request RA. The connection setup information VI is then communicated to the resource manager RM by the gatekeeper GK. For this embodiment it will be assumed that a voice connection in accordance with ITU-T Recommendation G.711 with a transmission bandwidth of 80 kbit/s is requested using the resource request RA.

According to an alternative form of connection setup, the connection setup information VI can contain a logical destination address (not shown), such as an alias address, e-mail address, URL (Uniform Resource Locator) or E.164 address, identifying the destination endpoint EG2. This logical destination address is converted by the gatekeeper GK into a transport address, in this case A2, identifying the destination endpoint EG2 and is transmitted as such to the resource manager RM. In this context, the term "transport address" refers to address information on the basis of which data packets can be routed through the communication system. A transport address of this kind can, for example, comprise an IP (Internet Protocol) address and a port number.

On the basis of communicated address information A1 and A2, the resource manager RM determines whether the connection V to be set up is to be directed via the transmission link US. If the transmission resources of a plurality of transmission links are to be administered by the resource manager RM, the resource manager RM determines via which of these transmission links the connection V is to be routed. This can preferably be performed using a table (not shown) in which an originating and destination address of a connection are assigned one or more individual transmission links via which that connection is to be routed.

If it is established by the resource manager RM that the connection V to be set up is routed via the transmission link US, the currently available transmission resources of that transmission link US are determined. This can be performed e.g. on the basis of another table (not shown) in which the currently available transmission resources—in some cases service- and/or priority-class-specific—for one or more individual transmission links of the communication system are listed. For the present embodiment it will be assumed that 50 kbit/s of transmission bandwidth is still available for the transmission link US. The transmission bandwidth determined is then compared with the 80 kbit/s transmission bandwidth required in the resource request RA. Provided that, as in this embodiment, the available bandwidth is found to be less than the transmission bandwidth requested, resource information RI is communicated to the gatekeeper GK by the resource manager RM. The resource information RI specifies the level of resources of the transmission link US currently still available. The gatekeeper GK then generates a message M containing the resource information RI and communicates it to the originating endpoint, in this case the terminal EG1.

As a variant of this method, instead of the resource information RI concerning the currently available bandwidth, a standardized specified bandwidth lower than or equal to the currently available transmission bandwidth can be communicated with the message M. For example, a specified bandwidth of 22 kbit/s for connections in accordance with ITU-T Recommendation G.723 can be communicated with the message M.

According to another variant of the method, a specification for a transmission method to be used, having a bandwidth requirement less than or equal to the currently available bandwidth, can be communicated with the message M instead of the resource information RI. Thus, for example, a transmission method in accordance with ITU-T Recommendation G.723 or G.712 for the connection V can be specified by the message M.

According to another variant of the method, generation of the message M can also be dependent solely on whether or not the connection V to be set up is to be routed via the transmission link US; i.e. in particular irrespective of temporary variations in the transmission resources of the transmission link US. For example, whenever it is determined that the connection V is routed via the transmission link US, a message M can be transmitted causing the transmission resources of the connection to be set up to be limited to a specified fixed resource requirement.

The message M can also be transmitted by the gatekeeper GK to the terminal AG2 for similar purposes.

If limiting the transmission resources of the connection to be set up to the still available level of resources of the transmission link US proves to be impractical, or if the remaining transmission resources still available after connection setup were disadvantageously low, the transmission resources of existing connections routed via the transmission link US can also be reduced by appropriate messages.

The message M can preferably be transmitted in the form of a so-called RAS (Registration, Admission and Status) message in accordance with ITU-T Recommendation H.323. RAS messages of this type allow, among other things, the transmission bandwidth of connections to be varied.

The message M causes the terminal EG1 to establish the connection V with a resource requirement reduced in accordance with the resource information RI. For this purpose, the terminal EG1 sends connection information VI, containing the originating and destination address information A1 and A2, and a reduced resource request RA2 to the gatekeeper GK. No more than the currently available transmission resources (specified by the resource information RI) of the transmission link US is requested by the resource request RA2. If connection setup cannot be implemented using reduced transmission resources of this kind, connection setup is terminated. In this embodiment, transmission resources for a connection as defined in Recommendation G.723 with a transmission bandwidth of 22 kbit/s are requested by the transmission request RA2. The gatekeeper GK then causes the transmission resources requested by the transmission request RA2 and still available to be reserved by the resource manager RM. By appropriate connection setup signaling, the gatekeeper GK then initiates logical setup of the connection V with the 22 kbit/s transmission bandwidth requested by the transmission request RA2 between the terminals EG1 and EG2.

When the connection has been set up, user data can be exchanged between the terminals EG1 and EG2 via the Local Area Networks LAN1 and LAN2 with guaranteed Quality of Service, i.e. in this case with a guaranteed transmission bandwidth of 22 kbit/s.

The transmission resources of the transmission link US can in some cases be administered and monitored by the resource manager RM on a service-class-specific, priority-class-specific and/or transmission-direction-specific basis.

A simple implementation of resource management of this kind relates to classifying the data traffic into different service and/or priority classes and assigning each of these classes a portion of the available transmission resources of the transmission link US—possibly on a transmission-direction-specific basis. Such data traffic classes are also commonly known as diffserv classes.

Information concerning specific transmission peculiarities of the transmission link US, such as a high data loss rate (e.g. in the case of radio links), high transmission delay and/or a particular type of transmission cost billing, can be communicated with the message M. Depending on such information, a transmission method which is less prone to data loss or transmission delay can be selected by the terminal EG1.

The transmission bandwidth required by the connection V can be varied within specified limits by varying the time spacing of the data packets to be transmitted in respect of the connection V. By lengthening these time spaces, the transmission bandwidth is reduced, as the portion of the control data transported in the header of the data packets because of the associated enlargement of the data packets is reduced in line with the data transmission volume. However, this increases both transmission delay and proneness to data packet losses. Reducing the spacing of the data packets has the opposite effect in each case.

The invention has been described in detail with particular reference to preferred embodiments thereof and examples, but it will be understood that variations and modifications can be effected within the spirit and scope of the invention.

The invention claimed is:

1. A method of setting up a connection with a guaranteed Quality of Service via a transmission bottleneck for a packet-oriented communication network, comprising:
    administering transmission resources on the transmission bottleneck by a resource manager;
    transmitting connection information identifying an origin and a destination of the connection to the resource manager to set up a connection with guaranteed Quality of Service;
    reviewing the connection information at the resource manager and determining whether the connection is to be routed via the transmission bottleneck;
    depending solely on whether the connection is to be routed via the transmission bottleneck, generating a message specifying a level of transmission resources of the transmission bottleneck available currently;
    sending the message to the origin of the connection; and
    requesting the level of the transmission resources for the connection specified by the message, at the origin of the connection, as a function of the message;
    wherein the requested transmission resources are limited to a reduced resource requirement if the connection is to be routed via the transmission bottleneck; and
    wherein the transmission bottleneck is a single transmission link.

2. The method according to claim 1, wherein the message is generated as a function of available transmission resources on the transmission bottleneck.

3. The method according to claim 2, wherein
    an already existing connection is routed via the transmission bottleneck,
    transmission resources were assigned to the already existing connection, and
    the assignment of transmission resources are modified for the already existing bottleneck according to whether the connection is to be routed via the transmission bottleneck.

4. The method according to claim 3, wherein
    a request for transmission resources is transmitted to the resource manager with the connection information, and
    the message is generated in accordance with the transmission resources requested.

5. The method according to claim 4, wherein
    the message includes resource information corresponding to the available transmission resources on the transmission bottleneck, and
    transmission resources for the connection are selected in accordance with the resource information.

6. The method according to claim 5, wherein
    the message includes method information concerning a potential transmission method for the connection, and
    a transmission method for the connection is selected at the origin of the connection based on the method information.

7. The method according to claim 6, wherein connection setup is based on whether the origin supports the selection of the transmission resources requested for the connection.

8. The method according to claim 7, wherein connection setup is based on to what extent the origin supports the selection of the transmission resources requested for the connection.

9. The method according to claim 8, wherein the transmission resources of the transmission bottleneck are administered by the resource manager on a service- and/or priority-class-specific basis.

10. The method according to claim 9, wherein a gatekeeper provides logical setup of the connection.

11. The method according to claim 1, wherein
    an already existing connection is routed via the transmission bottleneck,
    transmission resources were assigned to the already existing connection, and
    the assignment of transmission resources are modified for the already existing bottleneck according to whether the connection is to be routed via the transmission bottleneck.

12. The method according to claim 1, wherein
    a request for transmission resources is transmitted to the resource manager with the connection information, and
    the message is generated in accordance with the transmission resources requested.

13. The method according to claim 1, wherein
    the message includes resource information corresponding to the available transmission resources on the transmission bottleneck, and
    transmission resources for the connection are selected in accordance with the resource information.

14. The method according to claim 1, wherein
    the message includes method information concerning a potential transmission method for the connection, and
    a transmission method for the connection is selected at the origin of the connection based on the method information.

15. The method according to claim 1, wherein connection setup is based on whether the origin supports the selection of the transmission resources requested for the connection.

16. The method according to claim 1, wherein connection setup is based on to what extent the origin supports the selection of the transmission resources requested for the connection.

17. The method according to claim 1, wherein
the connection information includes bottleneck information identifying a desired bottleneck for the connection, and
on the basis of the bottleneck information, it is determined whether the transmission bottleneck is the desired bottleneck.

18. The method according to claim 1, wherein the transmission resources of the transmission bottleneck are administered by the resource manager on a service- and/or priority-class-specific basis.

19. The method according to claim 1, wherein a gatekeeper provides logical setup of the connection.

* * * * *